United States Patent
Lin

[19]

[11] Patent Number: 5,865,478
[45] Date of Patent: Feb. 2, 1999

[54] COUPLING DEVICE FOR DUCT

[76] Inventor: Hung Da Lin, 6F, No. 3, Lane 17, Tz Yiou Street, San Chong City, Taipei Hsien, Taiwan

[21] Appl. No.: 862,027

[22] Filed: May 22, 1997

[51] Int. Cl.[6] .............................. F16L 25/00; F16L 23/00
[52] U.S. Cl. ........................ 285/405; 285/424; 285/414; 403/401
[58] Field of Search .................... 285/405, 424, 285/411, 414, 363, 368; 403/401, 402; 138/DIG. 4

[56] References Cited

U.S. PATENT DOCUMENTS

| | | | |
|---|---|---|---|
| 634,275 | 10/1899 | Schenck | 138/DIG. 4 |
| 1,672,419 | 6/1928 | Lehman | 403/401 |
| 2,538,138 | 1/1951 | Webster | 403/401 |
| 2,972,396 | 2/1961 | Minick | 403/401 |
| 3,673,674 | 7/1972 | Catulle | 403/401 |
| 3,923,326 | 12/1975 | Mez | 285/424 |
| 4,283,080 | 8/1981 | Nakajima | 285/424 |
| 4,976,565 | 12/1990 | Stefan | 403/402 |
| 5,450,879 | 9/1995 | Toben | 285/424 |
| 5,564,758 | 10/1996 | Tiberio | 285/424 |

FOREIGN PATENT DOCUMENTS

| | | | |
|---|---|---|---|
| 2026947 | 2/1971 | Germany | 403/401 |
| 3904536 | 8/1990 | Germany | 285/424 |

Primary Examiner—Eric K. Nicholson

[57] ABSTRACT

A coupling device for coupling two or more ducts together includes a number of frames each having four beams secured together for forming a square shape and for securing onto the ducts. The beams each includes a flange extended upward and each includes a panel formed on each of two ends and inclined relative to the beams. A number of fasteners may secure the panels together for allowing the beams to be secured to the duct. A number of blocks may be engaged between the panels for allowing the beams to be secured to the duct of greater size.

1 Claim, 9 Drawing Sheets

COUPLING DEVICE FOR DUCT

BACKGROUND OF THE INVENTION

1. Field of the Invention

The present invention relates to a coupling device, and more particularly to a coupling device for duct.

2. Description of the Prior Art

Typical ducts for air conditioning apparatus comprise a parallelepiped body having two ends that are required to be coupled to the other ducts for forming an air passage for the air conditioning apparatus. Typically, a square frame is first formed by welding process and is then secured to the end portion of the duct by welding process. It may take a long time to assemble the ducts together in order to form the air passage. In addition, the frames are normally made of alloy materials having zinc applied onto the outer peripheral surface by electroplating process. However, when the zinc material is heated in the welding process, poisonous gas will be generated and will hurt the workers. Accordingly, the workers or the operators are required to set up an air drawing facility for drawing and for discharging the poisonous gas. This further complicates the assembling works to the ducts.

The present invention has arisen to mitigate and/or obviate the afore-described disadvantages of the conventional coupling devices for ducts.

SUMMARY OF THE INVENTION

The primary objective of the present invention is to provide a coupling device for easily and quickly assembling the ducts without welding processes and without generating poisonous gases.

In accordance with one aspect of the invention, there is provided a coupling device for coupling at least two ducts together, the coupling device comprises a plurality of frames each including four beams secured together for forming a square shape and for securing onto the ducts, the beams each including a flange extended upward and each including two ends, the ends of the beams each including a panel inclined relative to the beams, and means for securing the panels together for allowing the beams to be secured to the duct without welding processes and without generating any poisonous gases. The frames may also be secured to the middle portion of the duct for preventing the duct from being distorted.

A plurality of blocks are further provided for engaging between the panels and for increasing the size of the frame and for allowing the beams to be secured to the duct of greater size.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
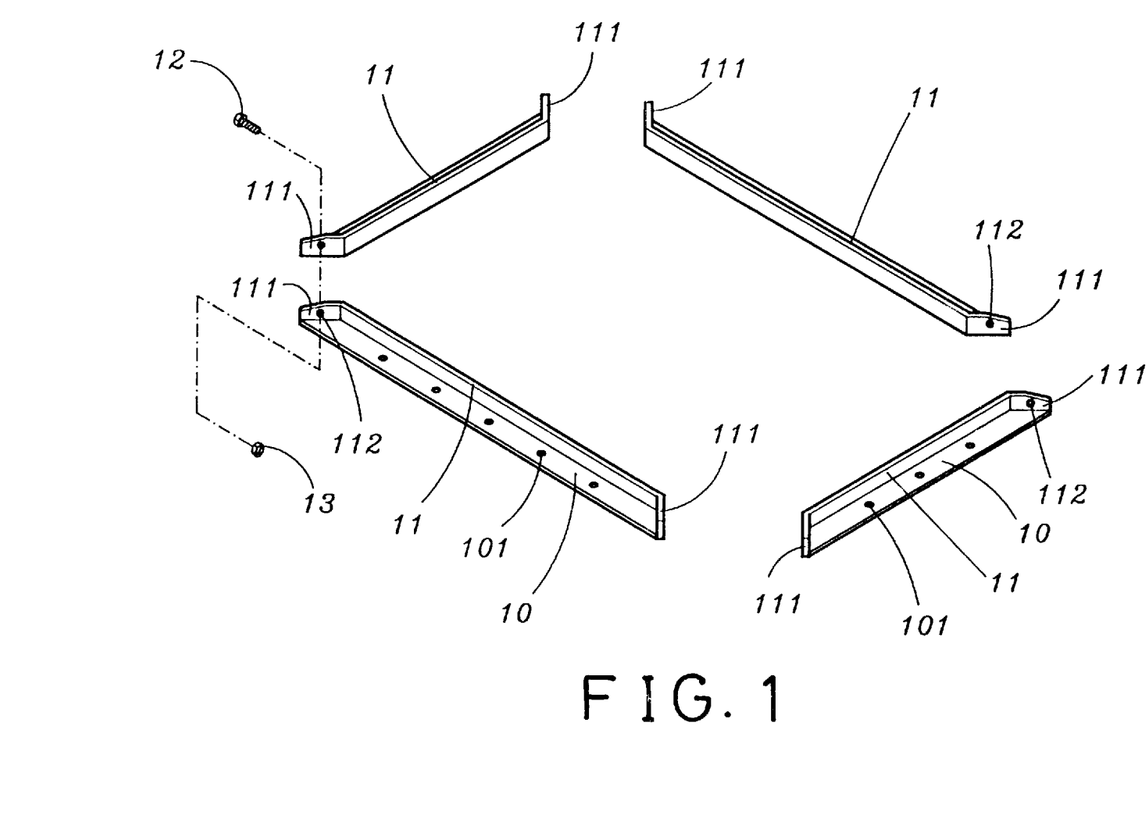
FIG. 1 is an exploded view of a coupling device for duct in accordance with the present invention.
Figure 2:
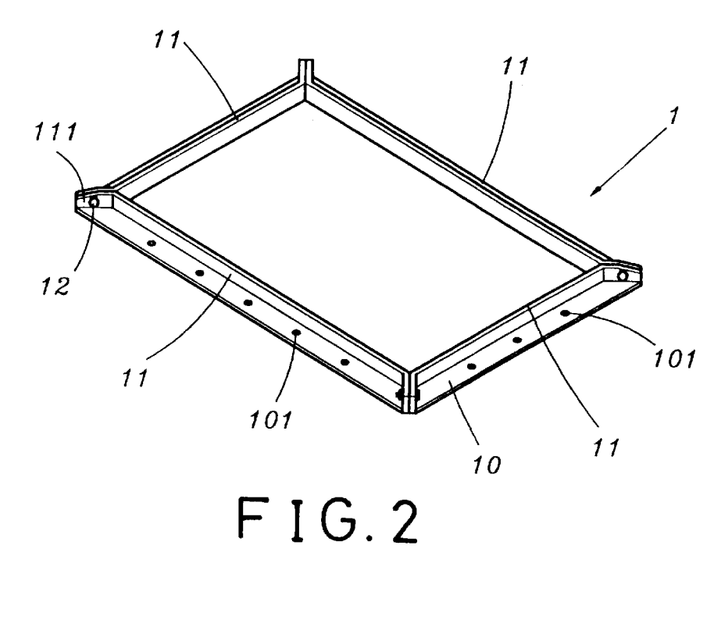
FIG. 2 is a perspective view of the coupling device for duct.
Figure 3:
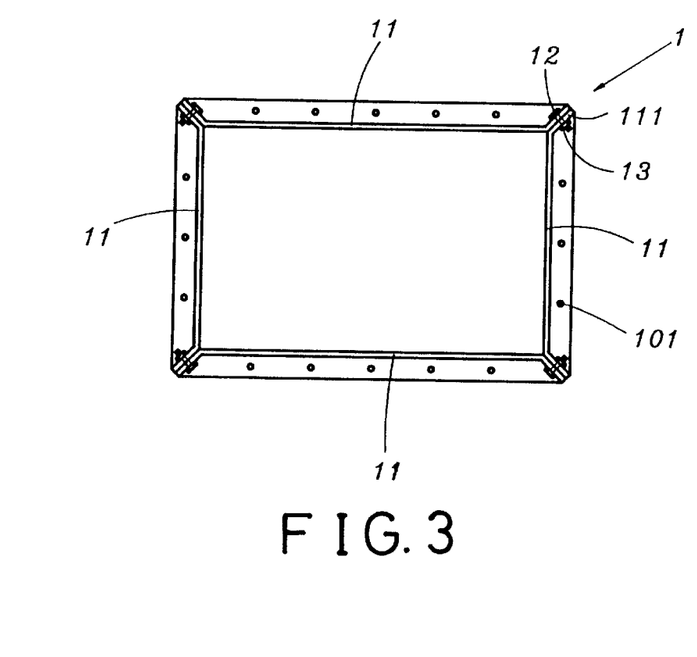
FIG. 3 is a top plane view of the coupling device.
Figure 4:
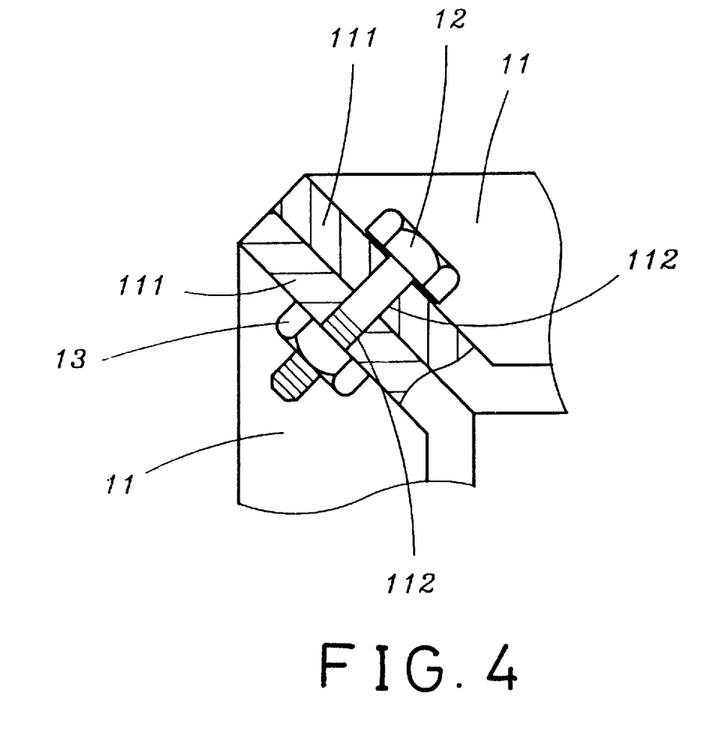
FIG. 4 is a partial cross sectional view showing the corner coupling portion of the coupling device.
Figure 6:
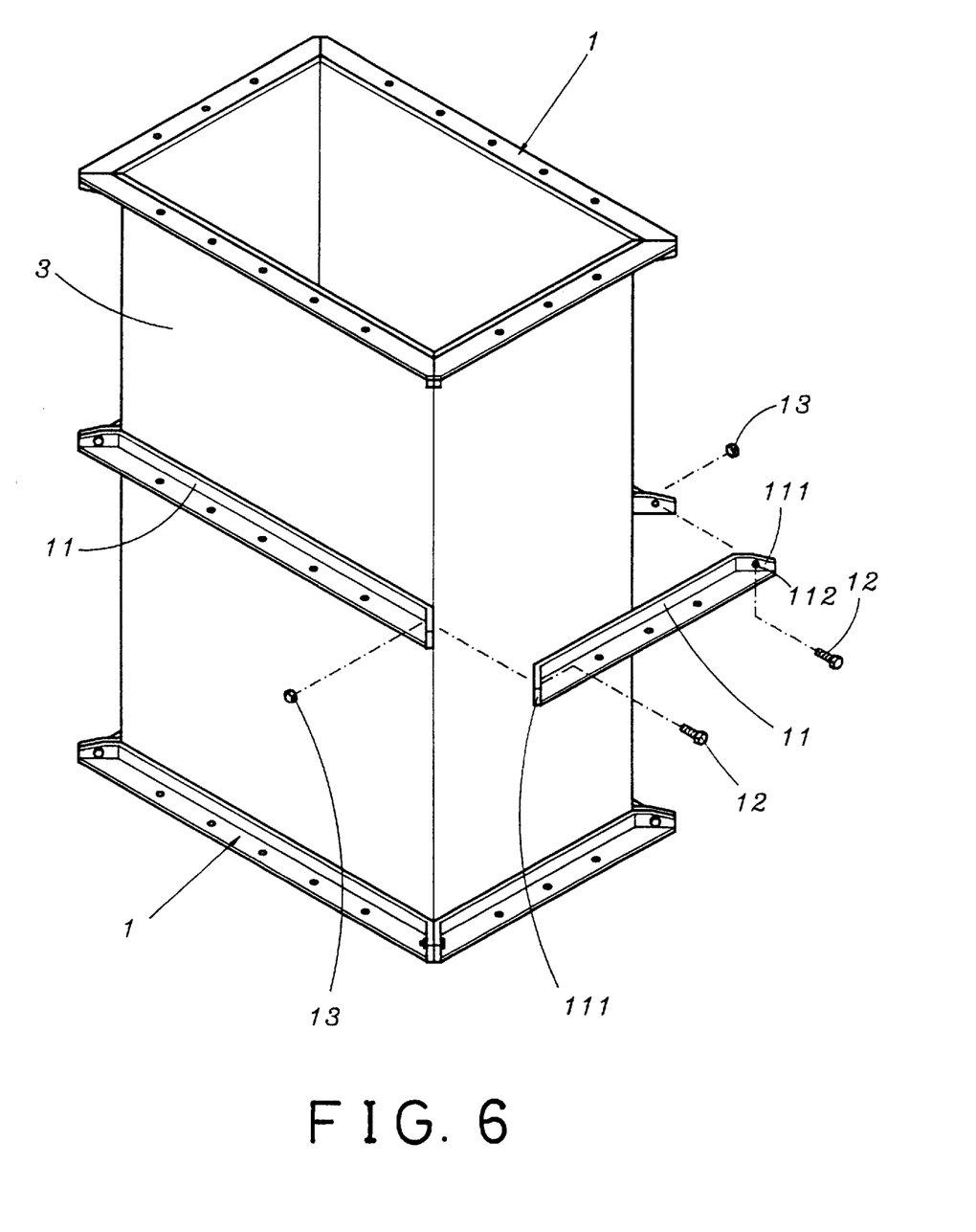
Figure 7:
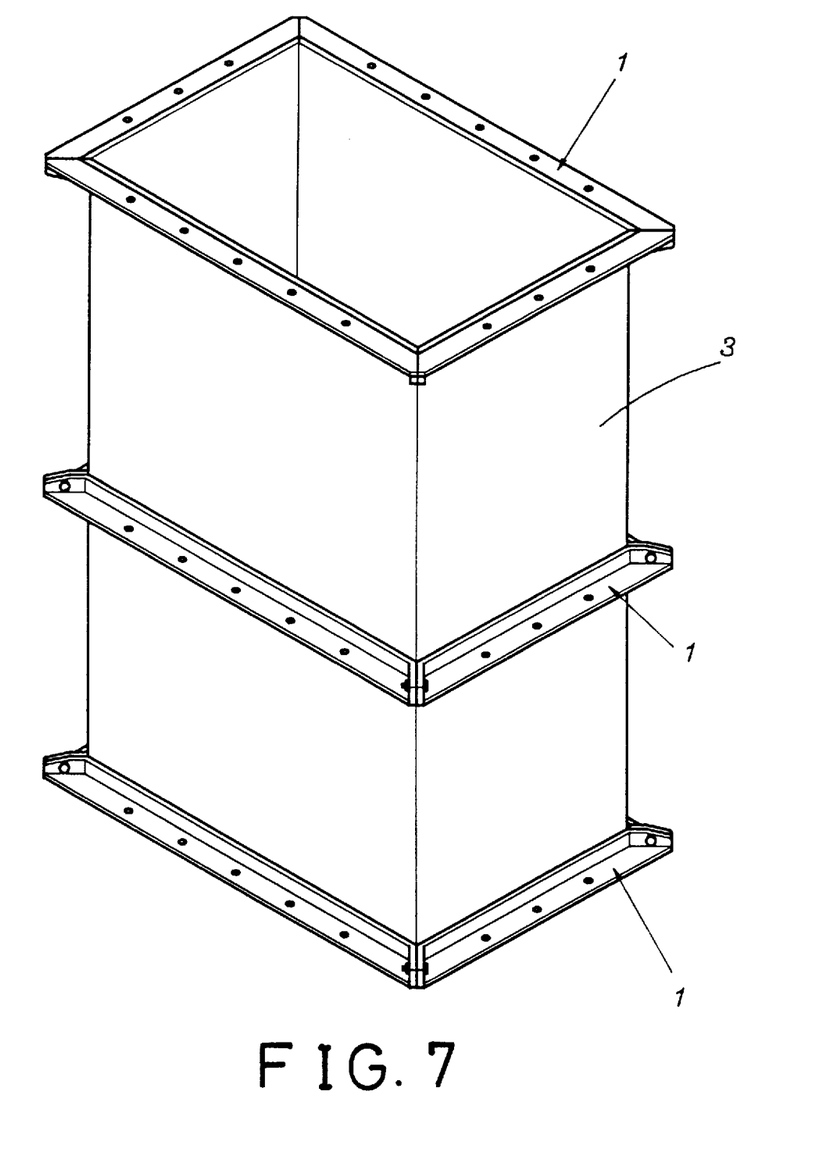
Figure 8:
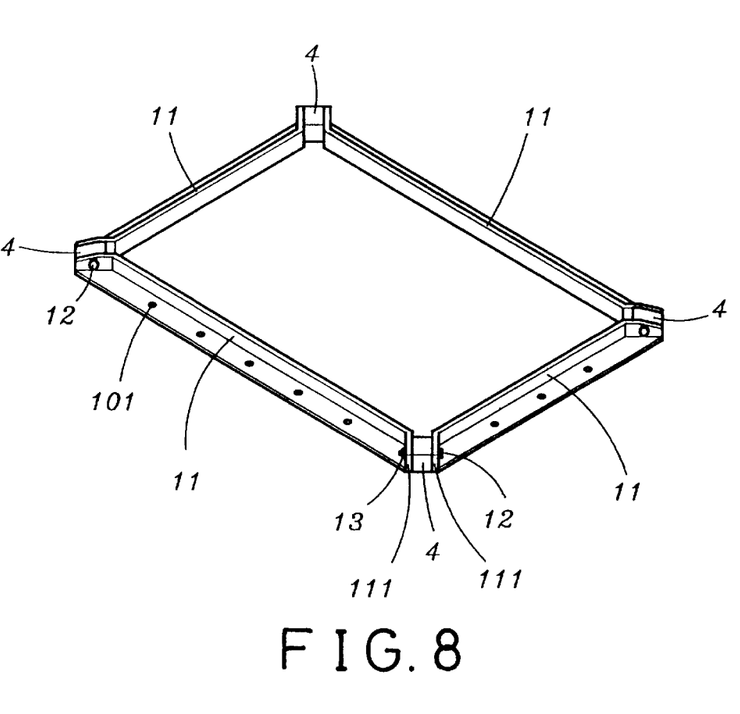
FIGS. 8, 9, 10 are perspective views illustrating another application of the coupling device.
Figure 9:
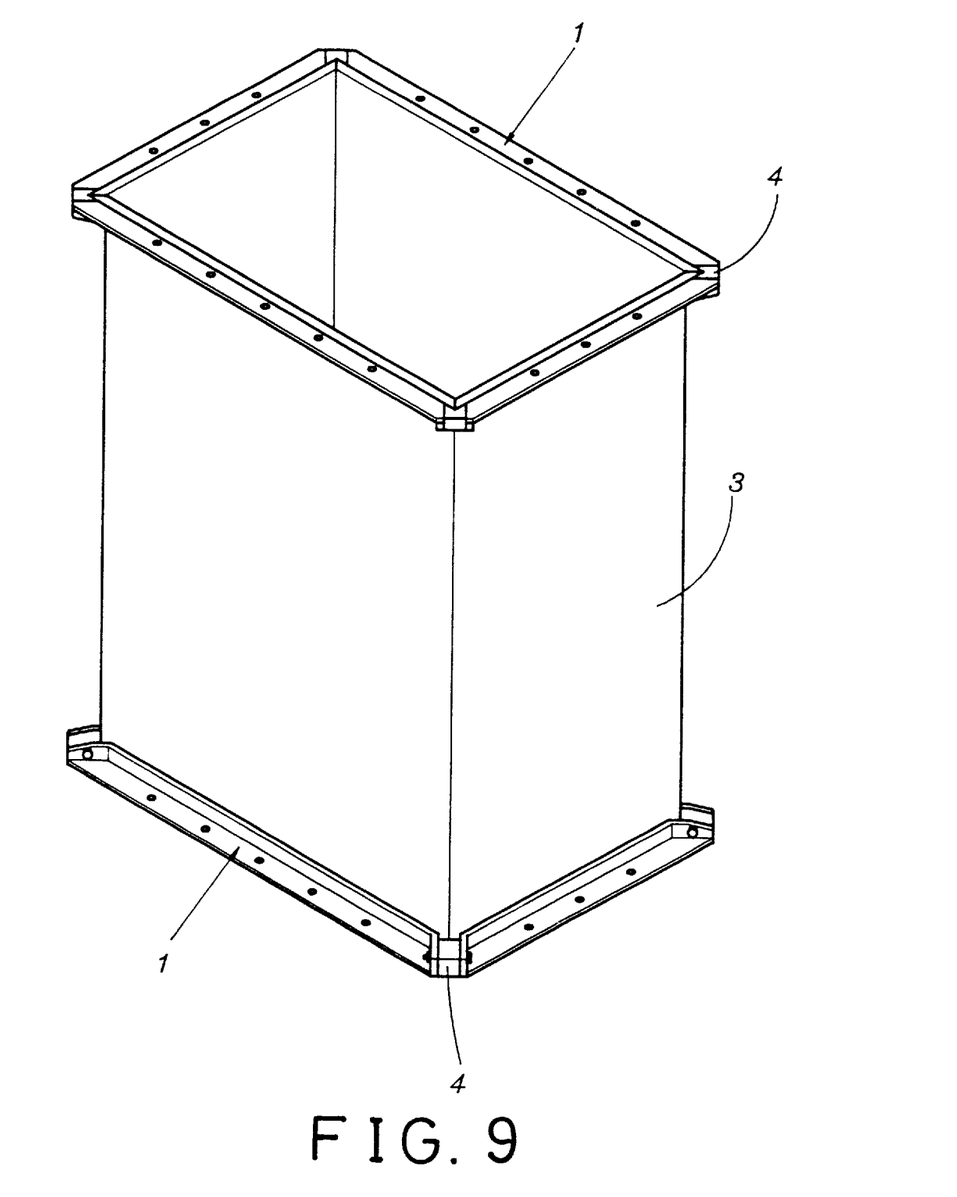
Figure 10:
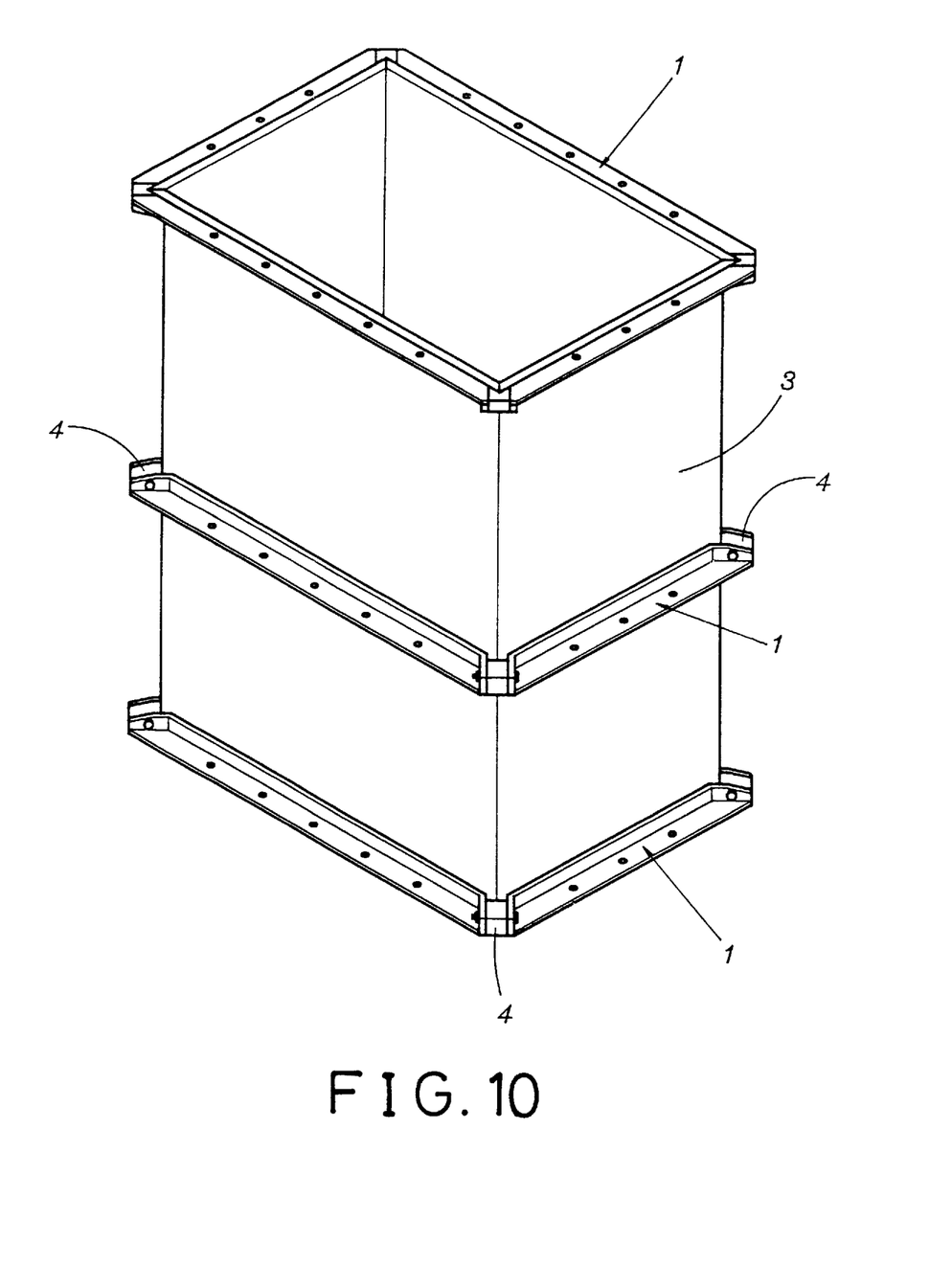
Figure 11:
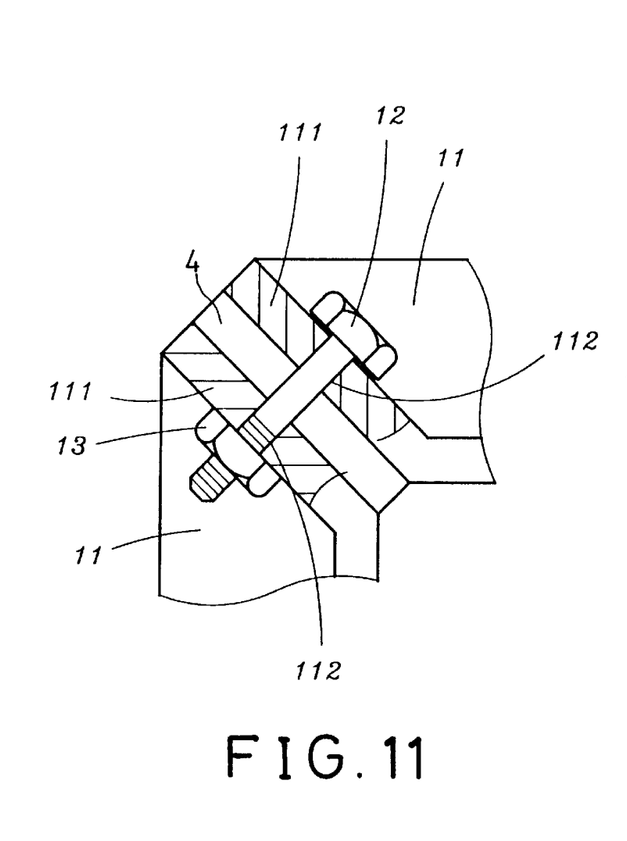
FIG. 11 is a partial cross sectional view showing the corner coupling portion of the coupling device as shown in FIGS. 8 to 10.

Referring to the drawings, and initially to FIGS. 1–5, a coupling device for a duct in accordance with the present invention comprises a number of frames 1 each including four L-shaped beams 10 each of which includes a flange 11 extended upward. The beams 10 each includes two ends each having a panel 111 that is preferably arranged in 45° relative to the beam 10, for allowing the panels 111 of different beams 10 to be contacted with each other when the beams 10 are arranged perpendicular to each other (FIGS. 2–4). The panels 111 each includes a hole 112 for engaging with fasteners such as bolts or screws 12 which are engaged with nuts 13 for securing the beams 10 together and for forming the square frame 1 and for securing to the ducts 3 (FIGS. 5–7) which may be coupled together for forming an air passage of an air conditioning apparatus. The frame 1 secured in the middle portion of the duct 3 may prevent the duct 3 from being distorted. The beams 10 each includes a number of apertures 101 for engaging with fasteners which may secure the frames 10 and thus the ducts 3 together.

Figure 5:
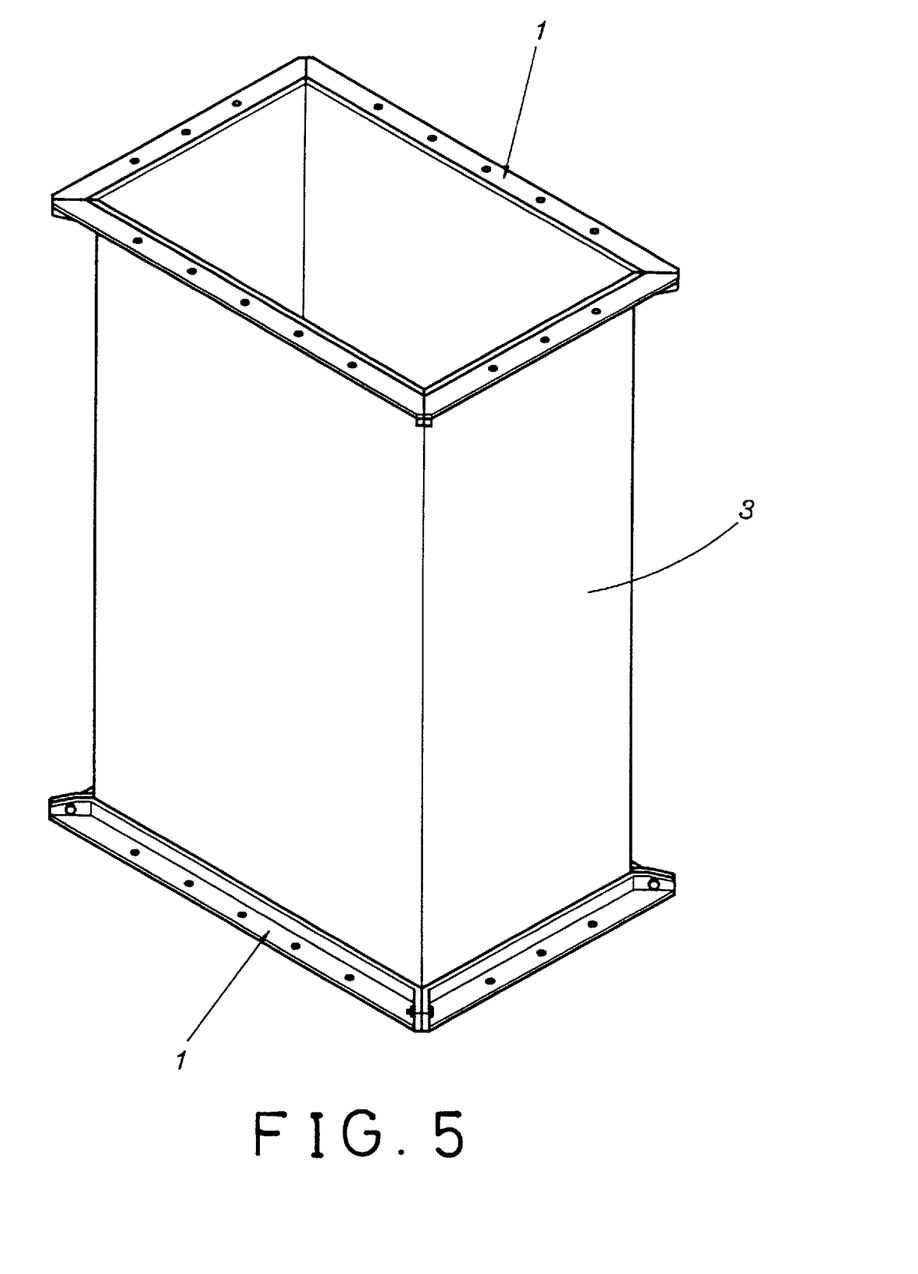
FIGS. 5, 6, 7 are perspective views illustrating the operation of the coupling device.

It is to be noted that the beams 10 may be solidly and firmly secured to the duct 3 when the panels 111 are secured together by the fasteners 12.

Referring next to FIGS. 8–11, a number of blocks 4 may be engaged between the panels 111 for allowing the frames 1 to be secured to the duct 3 having greater size. The frames 1 may thus be easily secured to the ducts without welding processes and without generating any poisonous gases. The panels 111 may be arranged to different angular direction relative to the beams 10, i.e., the panels 111 may be disposed in an angle other than 45°. The blocks 4 may be formed with two opposite sides having different included angle for engaging between the panels 111 and for allowing the beams 10 to be secured together to form the square shape.

It is preferable that the duct 3 includes two ends each having a peripheral flange extended radially outward for engaging with the frames 1 and for preventing the frames 1 from disengaging from the duct 3 when the frames 1 of the ducts 3 are secured together. The frame 1 which is secured to one end of the duct 3 may also be used for securing the duct 3 to the air conditioning apparatus.

Figure 12:
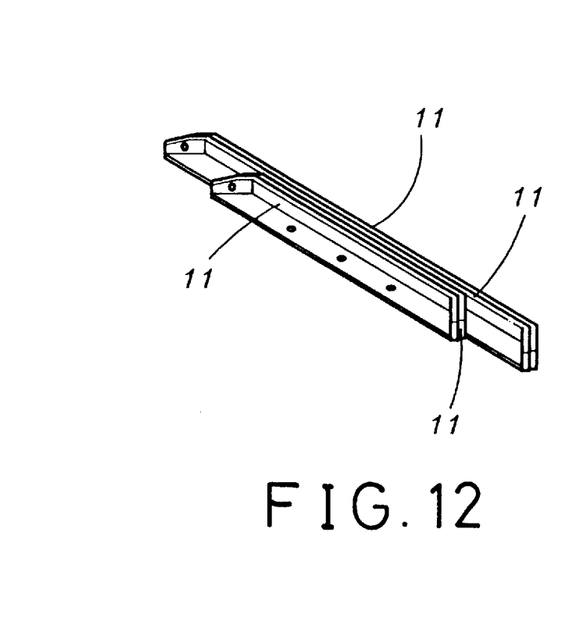
FIG. 12 is a perspective view illustrating the storing condition of the coupling device.

Referring next to FIG. 12, the beams 10 may be engaged with each other for forming a rather compact configuration which is excellent for transportation and storing purposes.

Accordingly, the coupling device for duct in accordance with the present invention includes a number of frames that may be easily and quickly assembled onto the ducts and secured together without welding processes and without generating poisonous gases.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A coupling device for coupling at least two ducts together, said coupling device comprising:

a plurality of frames each including four beams secured together for forming a square shape and for securing onto the ducts, said beams each including a flange extended upward and each including two ends, said ends of said beams each including a panel inclined relative to said beams, means for securing said panels together for allowing said beams to be secured to the duct, and a plurality of blocks for engaging between said panels and for allowing said beams to be secured to the duct of greater size.

* * * * *